(12) United States Patent
Luenberger

(10) Patent No.: US 7,613,646 B2
(45) Date of Patent: Nov. 3, 2009

(54) METHODS FOR ASSIGNING A PRICE TO AN ASSET THAT IS A DERIVATIVE OF A NON-MARKETED VARIABLE

(76) Inventor: David G. Luenberger, 813 Tolman Dr., Stanford, CA (US) 94305

( * ) Notice: Subject to any disclaimer, the term of this patent is extended or adjusted under 35 U.S.C. 154(b) by 1198 days.

(21) Appl. No.: 10/618,566

(22) Filed: Jul. 10, 2003

(65) Prior Publication Data

US 2004/0064393 A1    Apr. 1, 2004

Related U.S. Application Data

(60) Provisional application No. 60/395,715, filed on Jul. 12, 2002.

(51) Int. Cl.
*G06Q 40/00* (2006.01)
(52) U.S. Cl. .................................... 705/36 R
(58) Field of Classification Search ............... 705/36, 705/36 R
See application file for complete search history.

(56) References Cited

U.S. PATENT DOCUMENTS

| 6,061,662 | A | 5/2000 | Makivic | 705/36 |
|---|---|---|---|---|
| 2002/0002530 | A1 | 1/2002 | May | 705/37 |
| 2002/0065755 | A1 | 5/2002 | Shlafman et al. | 705/36 |
| 2002/0128955 | A1 | 9/2002 | Brady et al. | 705/37 |
| 2002/0133456 | A1 | 9/2002 | Lancaster et al. | 705/37 |
| 2002/0169703 | A1 | 11/2002 | Lutnick et al. | 705/37 |
| 2002/0178101 | A1 | 11/2002 | Swift | 705/36 |
| 2002/0188546 | A1 | 12/2002 | Tang | 705/37 |

OTHER PUBLICATIONS

Schwartz, Eduardo S., Rational pricing of Internet Companies, 2000, Asoociation for Investment Management and Research.*
John C. Hull, "Options futures, & other derivatives," Prentice Hall, Upper Saddle River, New Jersey 07458, 2002.

(Continued)

*Primary Examiner*—James A Kramer
*Assistant Examiner*—Eric T Wong
(74) *Attorney, Agent, or Firm*—Lumen Patent Firm

(57) ABSTRACT

A computer-implemented method is provided for valuing and hedging payoffs that are determined by an underlying non-marketed variable that moves randomly. The value assigned is that which is obtained by projecting the instantaneous return of the future payoff onto the span of marketed assets. An explicit method is provided for determining this value by determining a suitable market representative. In a continuous-time embodiment, the methodology is based on an extended Black-Scholes equation that accounts for the correlation between the underlying non-tradable asset and marketed assets. Once this extended equation is solved, the value of the payoff, the optimal hedging strategy, and the residual risk of the optimal hedge can be determined. In alternate embodiments, the same value is determined as the discounted expected value of the payoff, using risk-neutral probabilities for the non-marketed variable. These risk-neutral probabilities are again determined by the relation of the underlying variable to the payoff of a most-correlated marketed asset. The risk-neutral version of the method applies in both continuous-time and discrete-time frameworks, providing asset valuation, optimal hedging, and evaluation of the minimum residual risk after hedging.

14 Claims, 6 Drawing Sheets

OTHER PUBLICATIONS

David Heath et al., "A comparison of two quadratic approaches to hedging in incomplete markets," Mathematical Finance, vol. 11, No. 4 (Oct. 2001) 385-413.

Eduardo S. Schwartz et al., "Rational pricing of internet companies," 2000, Association for Investment Management and Research.

Hua He, "Consumption and portfolio policies with incomplete markets and short-sale constraints: the infinite dimensional case," Journal of Economic Theory 54, 259-304 (1991).

Robert C. Merton, "Applications of option-pricing theory: twenty-five year later," The American Economic Review, June 1998.

Hans Follmer et al., "Hedging of non-redundant contingent claims," 1986, Elsevier Science Publishers B. V. (North-Holland).

Fischer Black et al., "The pricing of options and corporate liabilities," The Journal of Political Economy, vol. 81, Issue 3(May-Jun. 1973), 637-654.

Martin Schweizer et al., "A guided tour through quadratic hedging approaches," Technische Universitat Berlin, Germany, Nov. 15, 1999.

D. G. Luenberger, "Projection pricing," Journal of Optimazation Theory and Applications: vol. 109, No. 1, pp. 1-25, Apr. 2001.

David G. Luenberger, "A correlation pricing formula," Journal of Economic Dynamics & Control, vol. 26, No. 7-8 (Jul. 2002), 1113-1126.

David G. Luenberger, "Arbitrage and universal pricing," Journal of Economic Dynamics & Control, vol. 26, No. 9 (Aug. 2002), 1613-1628.

* cited by examiner

METHODS FOR ASSIGNING A PRICE TO AN ASSET THAT IS A DERIVATIVE OF A NON-MARKETED VARIABLE

CROSS-REFERENCE TO RELATED APPLICATIONS

This application claims priority from U.S. Provisional Patent Application No. 60/395,715 filed Jul. 12, 2002, which is incorporated herein by reference.

FIELD OF THE INVENTION

This invention relates to computer-implemented methods within the field of finance. More specifically, the invention relates to methods directed at valuing complex uncertain cash flow streams and determining the best way to hedge exposure to such streams.

BACKGROUND

Frequently it is desirable to assign a price to an asset that is not currently traded, or to independently verify a price of an asset that is traded. There are two standard methods for assigning such prices (both of which earned Nobel prizes). The first is the capital asset pricing model (CAPM) [1] which is a method for assigning a price to an asset that has a duration of one period of time (such as one year) and is not traded at intermediate times. The second is the Black-Scholes method [2] for pricing financial derivatives, which assigns a price to a derivative (such as an option) on a underlying asset that is traded.

A derivative security is a security whose payoff is determined by the outcome of another underlying security. For example, a stock option on a traded stock is a derivative, since the final payoff of the option is completely determined by the value of the stock at the terminal time. The Black-Scholes equation is the standard method for determining the value of derivatives. It is based on the fact that, in continuous time, it is possible to replicate the payoff of a derivative by a portfolio consisting of the underlying security and a risk free asset (such as a U.S. Treasury bill) with a fixed risk free interest rate r. The fractions of the portfolio devoted to each of its components is adjusted continuously so that the portfolio's response to changes in the underlying security will perfectly mirror the response of the derivative. This adjustment process is termed a replication strategy. It is argued that the value of the derivative is equal to the cost of replication strategy. The cost V is determined by the Black-Scholes equation, which gives the cost (or value) $V(x,t)$ for values of $x \geq 0$ and $0 \leq t \leq T$ where T is the terminal time of the derivative. Specifically, the equation is $$rV(x, t) = V_t(x, t) + V_x(x, t)rx + \tfrac{1}{2}V_{xx}(x, t)x^2\sigma^2. \quad (1)$$

Here x denotes the value of the underlying security, r is the annual risk free interest rate, and $\sigma^2$ is the annual volatility of the underlying security. The notations $V_t$, $V_x$, $V_{xx}$ denote, respectively, the first partial derivative with respect to t, and to x, and the second partial derivative with respect to x. The equation is solved with the boundary condition $V(x, T) = F(x(T))$, where F denotes the payoff at time T of the derivative. For example, if the derivative is a call option with strike price K, then $F(x(T)) = \max(x(T) - K, 0)$.

A more general situation is where a payoff depends on a variable $x_e$ but this variable is not traded. For example, an option depending on a firm's revenue is of this form, because the revenue (which is $x_e$ in this case) is not traded. Hence the payoff depends on a non-traded underlying variable. In these situations it is impossible to form a replicating strategy using the conventional Black-Scholes equation because it is impossible to trade the underlying variable. The assumption underlying the conventional Black-Scholes equation breaks down.

Such problems have been studied by other researchers. The idea of using a market hedging strategy to minimize the expected squared error between the final value of the hedge and the actual payoff was proposed by Föllmer and Sondermann [3], who showed that it was possible in principle. Because minimizing the expected squared error is equivalent to orthogonal projection of the payoff onto the space of marketed payoffs (under a standard definition of projection), the method is often referred to as projection pricing. Their analysis, however, is purely abstract and does not exhibit any practical method for explicitly finding the hedge by solving a partial differential equation or a discrete version of it.

Merton (in his Nobel Prize acceptance speech [6]) emphasized the importance of the problem. He proposed a procedure based on the original Black-Scholes equation, but it is essentially an ad hoc method that does not coincide with projection. He and Pearson [7] studied a general framework of incomplete markets and formulated prices based on a consumer maximization problem. Again their method is abstract and does not provide a direct formula for the value that could be used in practice.

Some practitioners have proposed various ad hoc translations of the standard Black-Scholes equation to specific situations. For example, it is common practice to artificially increase the volatility of the underlying variable in an attempt to recognize that the variable is not really a traded asset. These methods are not based on optimality, do not fundamentally revise the original Black-Scholes equation, nor have any other real theoretical basis.

An approach that directly addresses the problem presents a solution in terms of a market price of risk, which is applicable to all derivatives of a non-marketed variable. The market price is difficult to measure, but it has sometimes been estimated [8]. However, even if the market price of risk is known, it does not lead to a hedging strategy.

Overall, there has not been an effective and practical method proposed that prices, optimally hedges, and computes the residual risk (after hedging) of derivatives of non-marketed variables.

SUMMARY OF THE INVENTION

Embodiments of the invention provide computer-implemented methods, based on projection, for determining the value of a derivative of a non-traded variable. In addition, some embodiments provide a method for determining the optimal hedging strategy and its residual risk.

Several embodiments of the invention are centered on a new, extended Black-Scholes equation of the form $$rV(x_e, t) = V_t(x_e, t) + V_{x_e}(x_e, t)x_e\left[\mu_e - \beta_{em}(\mu_m - r)\right] + \quad (2)$$
$$\tfrac{1}{2}V_{x_e x_e}(x_e, t)x_e^2\sigma_e^2,$$

where $\beta_{em} = \rho_{em}\sigma_e/\sigma_m$.

The underlying variable $x_e$ is not marketed, (or equivalently, not traded). By this we mean, throughout, that it is not marketed as a security that can be held without cost and pays no dividend while held. Thus, although oil can be bought and sold, it is not traded in this sense because there are storage costs. However, a futures contract on oil is traded as a security. In some cases, a variable that is not traded in our sense can be converted to a traded asset; (for example, a dividend-paying stock can be so converted by subtracting the present value of its dividend). Such cases do not require the methods of this invention (although the methods of this invention may lead more quickly to the correct result). If our methods are applied to a case where the underlying variable is in fact traded, the extended equation will reduce to the standard Black-Scholes equation.

The extended equation (2) uses, in addition to the underlying variable $x_e$, an asset $x_m$ that serves as a market representative. This representative is itself a marketed variable, or a linear combination of marketed assets, in the sense described above. This variable enters the equation indirectly through specification of certain parameters of the equation. The constants $\mu_e$ and $\mu_m$ are the drift rates of $x_e$ and $x_m$, respectively. $\rho_{em}$ is the correlation coefficient between $x_e$ and $x_m$. $\sigma_e^2$ and $\sigma_m^2$ are the annual variances of $x_e$ and $x_m$, respectively.

The replacement of r by $[\mu_e - \beta_{em}(\mu_m - r)]$ as a coefficient of $V_{x_e}(x_e, t)x_e$ in the partial differential equation distinguishes this extended equation from the conventional Black-Scholes equation. This coefficient accounts for the fact that perfect replication is not possible in all cases.

The market representative $x_m$ can be chosen in several ways, each of which leads to an identical result. In some embodiments $x_m$ is chosen to be the Markowitz (or market) portfolio of risky assets. According to other embodiments, $x_m$ is chosen to be a portfolio of marketed securities most correlated (related) to the underlying variable $x_e$. This method is simpler than choosing $x_m$ to be the Markowitz (market) portfolio and furthermore leads to an optimal mean-square hedging strategy.

Embodiments of the invention include an implementation based on a solution to a continuous-time version of the extended Black-Scholes equation. Thus, according to an embodiment, a method is provided for pricing a financial derivative of a non-marketed variable represented by $x_e$. The method includes determining a market representative $x_m$ that is useful in determining the value of the financial derivative. Information associated with the non-marketed variable and the market representative is retrieved. A solution to an equation involving a variable $V(x_e, t)$ representing a price of the financial derivative is then calculated. The equation, which in this embodiment is preferably the extended Black-Scholes equation, includes a coefficient involving the information associated with the market representative $x_m$ and the non-marketed variable $x_e$. An output including a calculated price of the financial derivative is then generated. Another embodiment includes a solution using formulas based on risk-neutral processes.

The price function can also be found in a discrete-time implementation. The underlying process can be discretized directly, or a finite-state model can be used. For example, in an embodiment of the invention, a method is provided for pricing a financial derivative of a non-marketed variable represented by $x_e$. The method includes retrieving information associated with a suitable market representative $x_m$. A solution is then found to a system of equations involving a variable $V(x_e, k)$ representing a price of the financial derivative at discrete times indexed by k. The equations include a coefficient involving the information associated with the variable $x_m$ associated with the market representative. An output including a calculated price of the financial derivative is then generated.

In another embodiment, a computer-implemented method is provided for pricing a financial derivative of a non-marketed variable represented by a finite-state variable B. The method includes determining a market representative, represented by a variable A. Risk-neutral probabilities are then calculated using a binomial lattice model associated with the non-marketed variable and the market representative. Values of a variable V on the lattice corresponding to the variable B are also calculated. The calculated values of V represent a calculated price of the financial derivative.

Embodiments of the invention may also involve computing an optimal hedge and other variables of interest. The above embodiments may be easily implemented in various different ways on any type of computer, and may be realized as instructions stored on a computer-readable medium.

DETAILED DESCRIPTION: OVERVIEW

Extended Black-Scholes Equation

Several embodiments of the invention are based on solving an extended Black-Scholes equation. This novel equation differs from the standard Black-Scholes equation in that it involves a new coefficient in one of its terms. This coefficient allows the applications of the equation to be extended to include situations that the standard Black-Scholes equation fails to cover.

Figure 1:
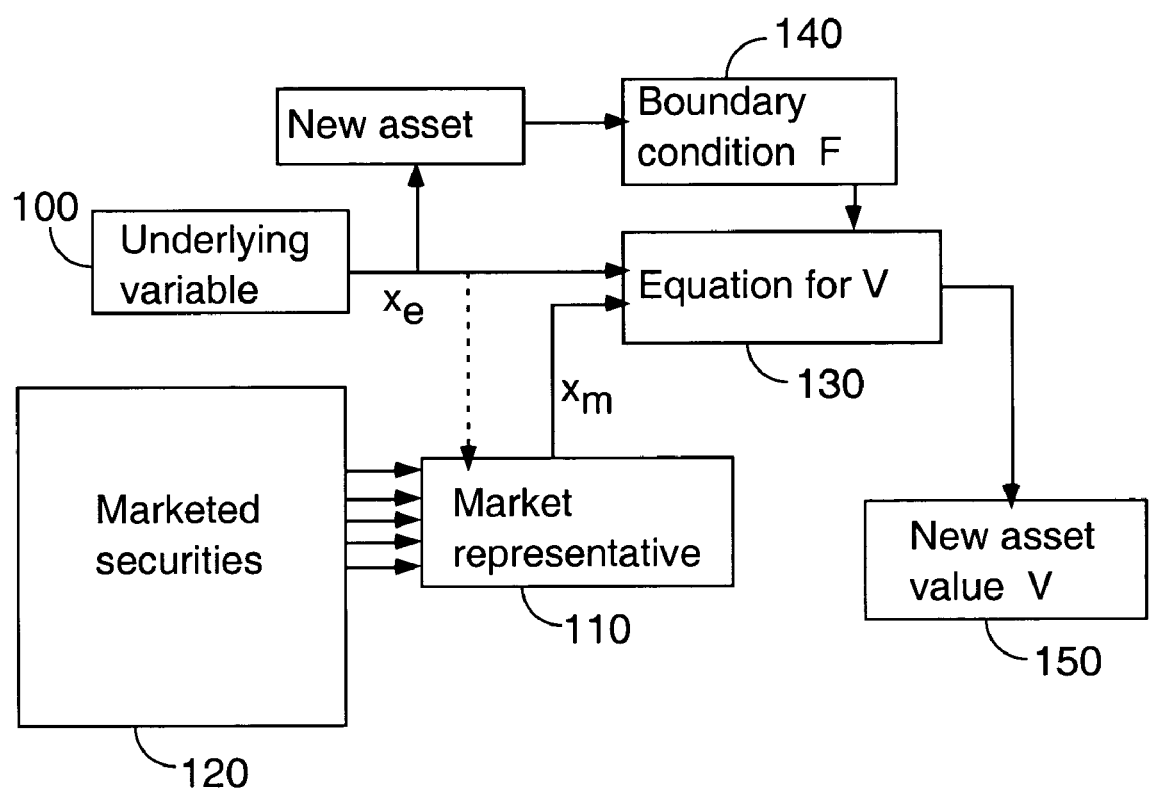
FIG. 1 presents a schematic related to a continuous-time implementation of the invention. It shows the key variables and how they combine to produce the value of the derivative of the underlying variable $x_e$.

A schematic depiction illustrating aspects of an embodiment of the invention is presented in FIG. 1. The figure shows an underlying variable $x_e$, which is specified at 100. The variable $x_e$ defines a new asset payoff through a function F. Also shown in the figure is a market representative $x_m$, determined at 110. The market representative $x_m$ is extracted from marketed securities, which are determined at 120. If this market representative is most correlated with $x_e$, it will depend on $x_e$; and this is indicated in the figure by the dashed line from $x_e$ to the market representation choice process, 110. The properties of this representative and $x_e$ define the particular coefficients of a partial differential equation, 130. The function F defines the terminal boundary condition at 140. The solution of the equation then yields the value of the new asset at 150.

Although the new method may at first appear arbitrary since it is based on projection, it has a compelling justification. The Black-Scholes approach uses replication to render the new payoff redundant, in the sense that the payoff is already embedded in the securities market. In a similar way, the new approach approximates the payoff and renders the payoff irrelevant in the sense that no risk-averse investor will want to own the new payoff because it is inferior to things already embedded in the securities market.

Optimal Hedge

Once the value function $V(x_e, t)$ is found, it is possible to find the portfolio strategy that best approximates the new asset, and can be used as a hedging strategy.

When the hedging portfolio has value $H(x_e, t)$, an amount $(H(x_e, t)-\phi)$ is invested in the risk free asset and an amount $\phi$ is invested in the most-correlated marketed asset where $$\phi(x_e, t) = V_x(x_e, t) x_e \beta_{ec}. \tag{3}$$

The minimum variance of the error $V(x_e, T) - H(x_e, T)$ can be found by solving another partial differential equation, namely, $$S_t(x_e, t) + S_{x_e}(x_e, t)\mu_e x_e + \frac{1}{2} S_{x_e x_e}(x_e, t)\sigma_e^2 x_e^2 + \tag{4}$$
$$e^{2r(T-t)}[V_{x_e}(x_e, t)\sigma_e x_e]^2 (1 - \rho_{ec}^2) = 0,$$

with boundary condition $S(x_e, T)=0$. The value $S(x_e, 0)$ is the variance of the replication error at T, as seen at $t=0$.

Risk-Neutral Form

An embodiment of this invention is an implementation as a practical risk-neutral valuation method. In this version the drift of the underlying variable $x_e$ is changed from $\mu_e$ to $[\mu_e - \beta_{em}(\mu_m - r)]$.

The general formula for value is then $$V(x_e, t) = e^{-r(T-t)} \hat{E}[F(x_e(T))], \tag{5}$$

where $\hat{E}$ denotes expectation with respect to the risk-neutral model. Hence, in this version, the value is simply the discounted expected value of the final payoff, with expectation taken with respect to the risk-neutral model.

The advantage of this form of the valuation is that value can be estimated by simulation. Basically, thousands of simulation runs of the underlying variable are made and the average discounted value is used as the expected discounted value. Such simulation methods are standard practice. A new feature of this embodiment is specification of the risk-neutral equation.

Discrete-Time Version

The risk-neutral form can be adapted to a discrete-time framework where the dynamics of random variables are represented by lattices. In the basic model, the underlying variable B is assumed at each step to either go up (with probability $p_B$) or down (with probability $1-p_B$) A payoff that is function of this underlying variable can be evaluated by using the risk-neutral probabilities, denoted $q_B$ and $1-q_B$. These, in turn, are found by using a market representative as in the continuous-time case. If this market representative is denoted A with price (value) $\upsilon_A$, the risk-neutral probability $q_B$ is $$q_B = p_B - cov[A, 1(U_B)][\bar{A} - \upsilon_A R]/\sigma_A^2 \tag{6}$$
$$= p_B - \beta_{1(U_B),A}[\bar{A} - \upsilon_A R] \tag{7}$$

where $1(U_B)$ is a payoff of 1 if B is up, and 0 if B is down. The expression "cov" stands for covariance, and $\mu_{1(U_B),A}$ is defined as $cov(1(U_B), A)/variance(A)$.

A derivative of B is a payoff with a value of $G_u$ if up occurs and payoff $G_d$ if down occurs. The current price of such a (future) payoff is $$V_B = \frac{1}{R}[q_B G_u + (1 - q_B) G_d]. \tag{8}$$

This is the basic method for the discrete-time case. The unique feature is the formula (6) for the risk-neutral probability.

Recursive Solution and Hedging

If the payoff occurs at the end of some finite number of steps (at the end of a lattice structure for B), the value function can be found recursively. The recursive solution is $$V_{k-1}(s_{k-1}) = \frac{1}{R}[q_B V_k(s_{k-1}^u) + (1 - q_B) V_k(s_{k-1}^d)], \tag{9}$$

where $s_{k-1}^u$ denotes the upper successor state to $s_{k-1}$ and $s_{k-1}^d$ denotes the lower successor state to $s_{k-1}$. The process is started with the terminal boundary condition specifying the payoff of the derivative G.

An optimal hedge H can be found. If at the beginning of time period k the hedge portfolio's value is $H_{k-1}$, then $H_{k-1} - \gamma V_{k-1}$ is invested in the risk free asset and $\gamma V_{k-1}$ is invested in the most-correlated asset A, where $$\gamma = cov(V_k/V_{k-1}, A)/\sigma_A^2 \tag{10}$$

The variance associated with optimal hedging can also be found by a recursion, as discussed later.

A Complete Methodology

Embodiments of the invention provide complete methodologies for treating payoffs that are derivative of non-traded variables. It has a strong justification and a straightforward representation. For many problems, the new method can be put into practice by augmenting standard methods of financial computation. The requisite equations or lattice structures are similar to those derived from the Black-Scholes methodology and hence the computational methods are similar. These are methods for solving partial differential equations, methods for evaluating lattices, and simulation methods. A significant additional step of the new method is determination of the market representative $x_m$, and estimation of the constants $\mu_e$, $\mu_m$ (the drifts), the variance of the market representative and the value of $\beta_{em}$.

Applications

Embodiments of this invention have applications in numerous financial areas. For example, the methods may serve four functions. The first is pricing, as in determining the fair value of an option on a non-marketed variable. The second is design, as in the design of optimal contracts, project plans, business arrangements, and various agreements. The third is hedging, to minimize the risk associated with a non-traded asset by use of offsetting market participation. The fourth function is that of risk assessment, determining the residual risk after optimal hedging. In all cases, a financial payoff is tied to the performance of a variable that moves randomly but which is not a marketed financial security. The variable that defines the payoff is termed the underlying variable.

The key idea is that when the underlying variable of an asset is not marketed, and hence the standard Black-Scholes equation does not apply, a market representative can be used instead.

One large area of application is to the pricing and hedging of "off-exchange" derivatives. For example, it may be desirable to hedge grapefruit production. Here the underlying variable is grapefruit price but there may be no financial instrument (such as a grapefruit futures contract) that is directly related to this underlying variable. Hence grapefruit production is not a derivative security and the Black-Scholes theory is not applicable. Nevertheless, a combination of orange juice futures contracts may be most-correlated with grapefruit prices and thus can serve as the market representative. This representative can be used (according to the valuation equation) to find value and also serve as the basis for an optimal (but imperfect) hedging strategy. Similar situations arise with off-exchange trading of energy contracts, agricultural products, metals, foreign exchange, and many others.

One important example is that of real estate projects. Typically, there is no underlying security for a real estate project, and thus the Black-Scholes equation does not apply. However, the payoff of such a project is likely correlated with interest rates, real estate investment trusts, and regional economic variables. A combination of these can serve as the appropriate market representative and hedging strategy.

Another general area of application is the determination of long-term futures prices. Typically, futures contracts extend several months, or at best a few years. Yet, many large projects span several years and correct pricing and hedging is important. The methods of this invention can be used to obtain such prices and hedges.

Bonds are often issued that have unique risk, not completely correlated to marketed securities. For example, a corporate bond's price may be only loosely correlated to interest rates and to the stock price of the associated firm and to the stock prices of firms in the same or related industry. Hence the bonds are not perfect derivatives, but the methods of this invention can be used to evaluate them. Large physical projects, such as oil rigs, dams, various other infrastructure projects and private or public works have cash flows that are to some extent associated with risks that are not derivatives of market securities. Projects in foreign countries have associated country risk, which can only partially be hedged with bonds and insurance.

Contracting is another large area of application. For example, an electronics firm may plan to purchase a great deal of DRAM during the year. The firm can design contracts with options and price caps that provide reduced risk at favorable prices. The design of such a contract can be deduced from the market representative and the methods of this document. Contracts for movie and publishing rights can also be designed this way.

The purchase of intellectual property rights through licenses is a fertile area of application. For example, a pharmaceutical firm may wish to license a biochemistry patent from a university, and both the design and the pricing of such a license could be carried out with the methods. In this case, the market representative may be a combination of the security prices of other pharmaceutical companies, HMOs, and other insurance companies.

Insurance and various guarantees generally embody a great deal of risk. Such risk can be priced and hedged by the insurance company or guarantor by these methods. The risk of fire in an area may, for example, be correlated with weather derivatives and energy prices.

Mortgages contain interest rate risk, but also prepayment risk. The prepayment risk may be correlated (imperfectly) to stock market indices, real estate prices, as well as interest rates.

Real options is a general term which includes options related to many of the examples listed above, but especially to business projects. The methods of this document can improve both the evaluation and design of such projects by using a theoretically justified valuation formula rather than an ad hoc use of the Black-Scholes equation.

Another important area of application is that of overall risk assessment. The residual risk of each individual project or derivative can be determined by the variance given as the solution to a partial differential equation that is used in embodiments of the invention. The risk associated with a collection of such projects can be found by solving a similar equation that depends on the value function for each of the projects separately.

DETAILED DESCRIPTION:
CONTINUOUS-TIME CASE

This section presents example application areas and gives a detailed description in both the continuous-time and discrete-time frameworks.

Outline of Steps: Continuous-time Framework

Figure 2:
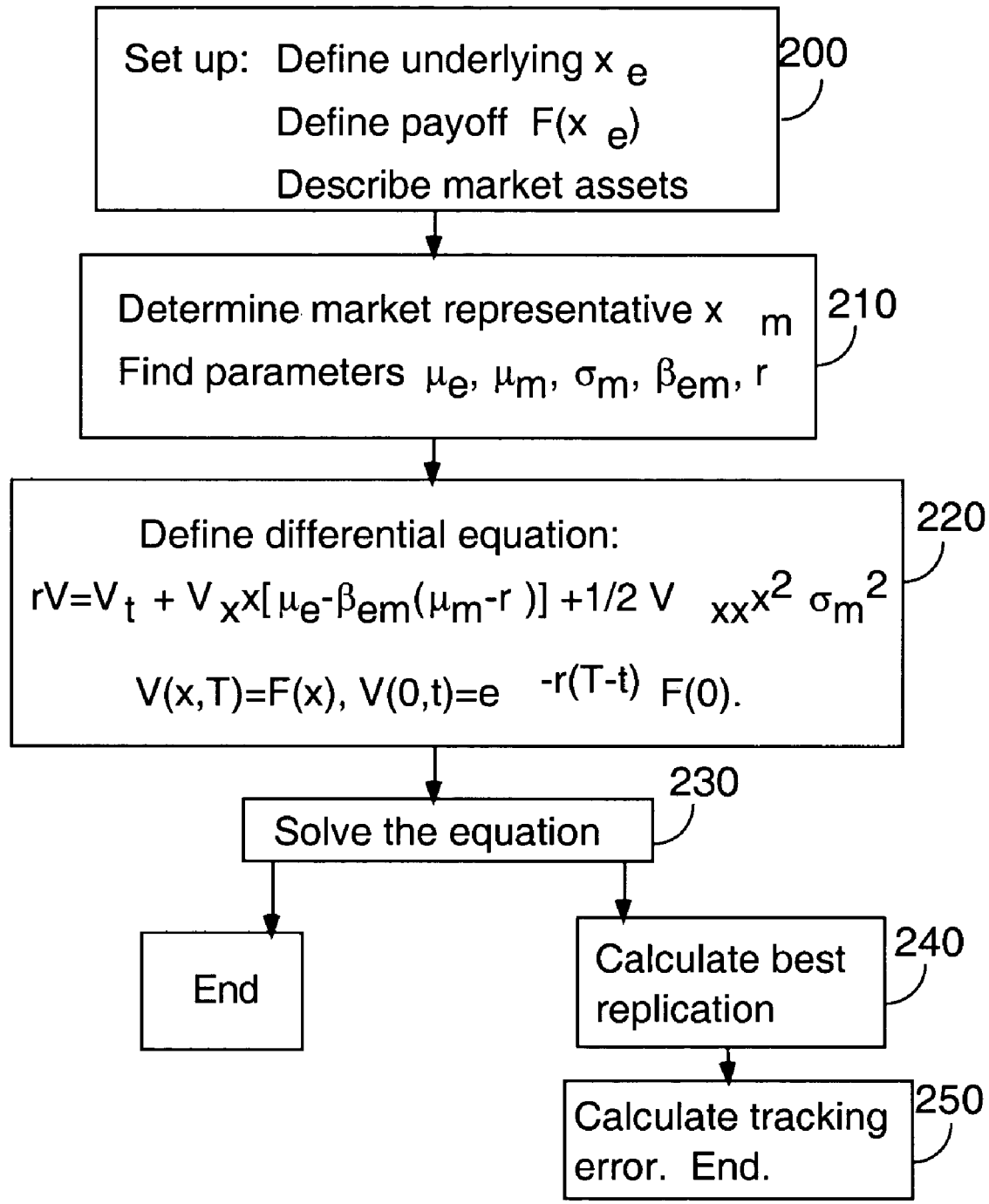
FIG. 2 is a flow diagram showing the steps of the method in the continuous-time case.

An outline of the steps used in one embodiment of the invention are indicated in FIG. 2.

1. Set Up. In this step, 200, we identify an asset of interest which gives a future payoff (or payoffs) according to the value of some variable that moves randomly with time. This variable is termed the underlying variable. If this variable is itself traded (and is governed by geometric Brownian motion (GBM)), then the asset of interest is a pure derivative and the standard Black-Scholes equation can be used. If the underlying variable is not traded, then the extended Black-Scholes equation is used.

For example, an asset might be the future harvest of a grapefruit farm. The underlying variable determining payoff is grapefruit price which varies randomly from the current time until harvest. This underlying variable cannot be traded. It is true, of course, that grapefruit can be bought and sold at any time, but grapefruit cannot be held as a security since there are storage costs and grapefruit is perishable. The grapefruit price is denoted $x_e$ and is assumed to follow a GBM process of the form $$dx_e = \mu_e x_e dt + \sigma_e x_e dz_e \quad (11)$$

where $z_e$ is a standardized Wiener process. The process starts at time 0. The asset to be priced has a payoff at time T of $F(x_e, T)$.

There are n (perhaps thousands of) securities that can be traded. Each of these follows a similar processes, namely, $$dx_i = \mu_i x_i dt + \sigma_i x_i dz_i \quad (12)$$

where $x_i$ is the value of the i-th asset, for $1=1, 2, \ldots, n$. The standardized Wiener processes $z_i$ (of zero mean and unit variance) are correlated, with $cov(dz_i, dz_j) = \rho_{ij} dt$. Among these n assets there is an asset that is risk free at each instant. By forming an appropriate combination of the marketed assets, it may be assumed without loss of generality that the risk free asset is $x_n$. Then $$dx_n = rx_n dt.$$

In the standard Black-Scholes method, only the underlying security, the risk free rate r, and the payoff function is specified. No consideration is given to other securities, because the underlying security is all that is needed. In embodiments of this invention, other securities are considered in order to select a market representative, as explained in the next step.

2. Determination of a Market Representative. The extended Black-Scholes equation uses a market representative $x_m$, which is a combination of marketed assets. In this step, 210, this market representative is determined. Generally, this market representative can be chosen in one of several ways.

(a) A most-correlated asset is a marketed asset $x_c$ (or a combination of marketed assets) whose instantaneous return is most correlated (or close to most correlated) with $dx_e$. In theory, it is obtained by solving the equations $$\sum_{j=1}^{n-1} \sigma_{ij}\alpha_j = \sigma_{ie} \quad (13)$$

for each i=1, 2, ... n−1. The resulting $\alpha_i$'s are then normalized to sum to 1. The most-correlated asset is the asset $x_c$ with instantaneous return $$\frac{dx_c}{x_c} = \sum_{i=1}^{n-1} \alpha_i \frac{dx_i}{x_i}, \quad (14)$$

$x_c$ can be used as the market representative $x_m$.

In practice, a most-correlated asset is obtained by considering only those securities that are obviously closely related to the underlying variable $x_e$.

In the case of grapefruit, for example, a most-correlated asset might be a futures contract on orange juice. (There are no grapefruit futures.) Such contracts are marketed securities, and are likely to be highly correlated with grapefruit prices. As another example, in seeking a most-correlated asset for DRAM (computer memory chips), one might consider the stock of several companies that produce DRAM and then find the combination of these stocks that is most correlated with DRAM prices.

Ideally, this step entails identification of suitable candidates, evaluation of the co-variances of these candidates among themselves and with the underlying variable, and optimization of the combination of these candidates to provide the highest correlation. These steps are not difficult provided one has historical data on the security prices and the underlying variable.

However, it should be understood that correlations, variances, and drift rates are measured approximately, and hence in practice exact parameters are not known, even for the standard Black-Scholes equation. Likewise, it is impossible to prove that a given asset is, in fact, the asset that is 'most' correlated with the underlying variable. As in any method driven by estimates from limited data, one attempts to balance accuracy with data gathering and processing effort. Thus, in the context of the present description, a 'most correlated' asset or variable is defined to include not only the maximally correlated asset or variable, but also approximations thereto.

Although in practice a 'most-correlated' asset is not known with certainty, this embodiment is distinguished from the following one by the fact that the search for the strongest correlation is restricted to obvious candidates within one or a few related market sectors or industries. For example, the steel industry likely would not be considered as a candidate for an asset of grapefruit production. This contrasts with the Markowitz portfolio (generally approximated by the market portfolio) which includes all marketed securities.

(b) The Markowitz or market portfolio. This alternative embodiment produces the same price as the method described above. This method is typically less convenient than the first and does not lead to an optimal hedging (or, equivalently, replicating) portfolio. In theory, this alternative is determined by solving the system of equations $$\sum_{j=1}^{n-1} \sigma_{ij}\alpha_j = \mu_j - r.$$

These $\alpha_i$'s are then normalized to sum to 1 and used to define the portfolio with instantaneous return $$\frac{dx_M}{x_M} = \sum_{i=1}^{n-1} \frac{dx_i}{x_i} \equiv \mu_M dt + \sigma_M dz_M.$$

Then $x_M$ can be used as the market representative $x_m$.

As an approximation to the Markowitz portfolio, the market portfolio consisting of the capitalized weighted average of the marketed assets may be used. For example, a diversified mutual fund can be used, or the S&P 500 index. Each of these is nevertheless only an approximation. It would be essentially impossible to determine the true Markowitz portfolio because of the inherent error associated with determining the required parameters.

In contrast to the previous embodiment, the steel sector, and indeed all sectors of the economy, would be represented in this method. The advantage of this method is that the Markowitz (or market) portfolio, once found, can be used for derivatives of any underlying variable.

(c) Local index. Suppose there are two non-marketed variables $x_{e1}$ and $x_{e2}$ that determine various derivative assets. Let $x_{c1}$ and $x_{c2}$ be corresponding most-correlated risky marketed assets. Next let $x_m$ be the Markowitz combination of $x_{c1}$ and $X_{c2}$. Then the single asset $x_m$ can be used as a market asset for all derivatives of $x_{e1}$ and $x_{e2}$. This procedure can be directly extended to any number of underlying variables.

To complete the set up, the payoff function $F(x_e(T))$, the parameters $\mu_e$ and $\sigma_e$ of the underlying variable, the parameters $\mu_m$, $\beta_{em}$, and the interest rate r are specified. As stated earlier, in practice it is not necessary to specify the parameters of every marketed security. A market representative can be determined by consideration of those assets closely related to the underlying variable or, alternatively, to a broad index of the market.

3. Define the Differential Equation. In step 220 various terms are specified for the extended Black-Scholes equation:

$$rV(x_e, t) = V_t(x_e, t) + V_{x_e}(x_e, t)x_e[\mu_e - \beta_{em}(\mu_m - r)] + \frac{1}{2}V_{x_e x_e}(x_e, t)x_e^2 \sigma_e^2, \quad (15)$$

where $\rho_{em} = E[dz_e dz_m]$ $\beta_{em} = \rho_{em}\sigma_e/\sigma_m$.

The subscript m denotes the market representative. The boundary conditions are $V(x_e, T) = F(x_e(T))$ $V(0, t) = e^{-r(T-t)}F(0)$.

Equation (15) plays a central role in several embodiments of the invention. It differs from the standard Black-Scholes equation in the coefficient $[\mu_e - \beta_{em}(\mu_m - r)]$ This coefficient replaces r in the standard Black-Scholes equation as a coefficient of $V_{x_e}(x_e, t)x_e$. The new coefficient uses properties of the market representative $x_m$. Equation (15) reduces to the Black-Scholes equation if the new asset is a pure derivative so that $x_m = x_e$ is the most-correlated market representative.

4. Solve the Differential Equation. In step 230 the differential equation is solved. This can be done analytically in some cases. Most often it will be solved by standard numerical techniques. Once the parameters are known, solution of the equation is no more difficult than solution of the standard Black-Scholes equation. It is only one coefficient that is different.

The value of $V(x_e(0), 0)$ is the proper price of the derivative. The procedure can be terminated here, with the proper price. Additional information is obtained in the next two steps.

5. Find the Optimal Replicating Portfolio. Optionally, step 240 calculates the best replicating portfolio. One may replicate the market portion of the risk in the asset by holding an appropriate portfolio of market securities with initial value equal to $V(x_e(0), 0)$. This portfolio is a combination of the most-correlated asset and the risk free asset. The amount to be held in the most-correlated asset as a function of $x_e$ and t is $\phi = V_{x_e}(x_e, t)x_e\beta_{ec}$ where in this case, we use the subscript c to emphasize that the market representative is taken to be the most-correlated asset. Holding the negative of this replicating portfolio produces an optimal hedge for the derivative. This procedure is essentially identical to that used in standard derivatives of the Black-Scholes type. The difference is that in the Black-Scholes case the hedge is perfect, while in embodiments of this invention the hedge may not be perfect.

For example, in the case of grapefruit production, the optimal hedge would be a portfolio consisting of the risk free asset and a position in orange juice futures. The proportions of the two components of the portfolio would be adjusted frequently according to the formula for $\phi$. If the hedge is in place, the hedge portfolio yields cash immediately equal to $V(x_e(0), 0)$ and the final net payoff (consisting of sale of the grapefruit production and settling of the hedge contract) is on average zero, but it has a residual variance.

Ideally, the portfolio adjustment would be continuous, but in practice periodic adjustments (daily, weekly, or monthly) are sufficiently accurate. These types of adjustments are common in pure derivatives methodology as well, where the ideal hedge is perfect.

6. Find the Error Variance. Optionally, step 250 calculates the tracking error. The variance of the part of the payoff that cannot be hedged is found by solving another partial differential equation which uses the solution to (15) as an input. The equation is $$S_t(x_e, t) + S_{x_e}\mu_e x_e + \frac{1}{2}S_{x_e x_e}\sigma_e^2 x_e^2 + e^{2r(T-t)}[V_{x_e}\sigma_e x_e]^2(1 - \rho_{ec}^2) = 0 \quad (16)$$

with boundary condition $S(x_e, T) = 0$. The value of $S(x_e(0), 0)$ is the variance of the error at time T as seen at time 0. This may be extended to computation of the variance associated with combinations of derivatives.

For example, in the case of grapefruit, the value of $S(x_e(0), 0)$ gives the variance of the exposure at time T with an optimal orange juice futures hedge. That is, with the hedge, $V(x_e(0), 0)$ is obtained at $t=0$ and the net amount (of the combined grapefruit production and hedge) attained at $t=T$ has expected value 0 but variance equal to $S(x_e(0), 0)$.

This calculation of error variance has no analogy in the standard Black-Scholes case because in that case the error is always zero (in theory). Hence, this method for finding the hedge variance is new and important. It is not difficult to solve the appropriate partial differential equation, for indeed, it is similar in structure to the equation for value.

Extensions

There are several important extensions of the method. For example,

1. Inclusion of cash flows that occur with time, with incremental cash at time t being of the form $h(x_e, t)dt$.
2. Varying parameters. The parameters of the model can vary with t, $x_e$, and the $x_i$'s. In general this leads to a partial differential equation of higher order.
3. Parameters, such as the risk free rate, may be governed by stochastic processes.
4. Additional variables. Additional non-marketed variables can be introduced. These serve as "state variables" for the system. For example, a state variable might be total industry productive capacity, or estimates on the probability that certain legislation will be passed.
5. Estimation variables. A suitable non-marketed but observed variable may be the estimate of an unobserved variable that serves as the underlying variable for the payoff. If the estimate converges to the actual value at the time of payoff, the estimate may be used at all points instead of the original variable. For example, the best estimate for yearly revenue may converge to the actual figure as the year ends.
6. Non-market random components. If the final payoff is a function of the form $F^*(x_e, y, T)$ where y is random and independent of $x_e$ and the market, then we define $F(x_e, t) = E_y[F^*(x_e, y, T)]$ where $E_y$ denotes expectation with respect to y. The value of the payoff can then be found with this F and it will be the proper price. In this case, the boundary condition for auxiliary differential equation for variance is $S(x_e, T) = \text{variance}_y[F^*(x_e, y, T)]$.

7. Alternative Processes. The method of relating the non-market variable to the market in order to obtain the correct price can be extended to alternative processes, including jump processes, and moving average processes.
8. Market Cash Flows. In some cases the cash flows or payoffs may depend on marketed variables as well as non-marketed variables. In such a case the value function V will depend on both $x_e$ and the marketed variables. The most-correlated asset for the marketed variables will be those variables themselves, while the market representative for the non-marketed variable is found as in the basic case.
9. Path Dependent Cash Flows. These are cash flows such as $\max_t[0, x_e(t)]$, $0 \leq t \leq T$ that depend on the actual path taken by $x_e$ rather than on its instantaneous or final value. The risk-neutral process can be used to evaluate such situations by taking the risk-neutral discounted expected value of all cash flows.

Brief Derivation of the Equations

We refer to step #1 (Set up) to define the problem. Hence, we have an underlying variable $x_e$ governed by geometric Brownian motion (GBM) over $0 \leq t \leq T$ as $$dx_e = \mu_e x_e dt + \sigma_e x_e dz_e, \quad (17)$$

and likewise there are n marketed assets that also are governed by GBM. There is a special asset of interest whose payoff at time T is $F(x_e(T))$.

We propose an (initially unknown) price function $V(x_e, t)$ on the time interval $[0, T]$ with terminal value $V(x_e, T) = F(x_e)$. It will be defined by instantaneous discounted projection.

Figure 3:
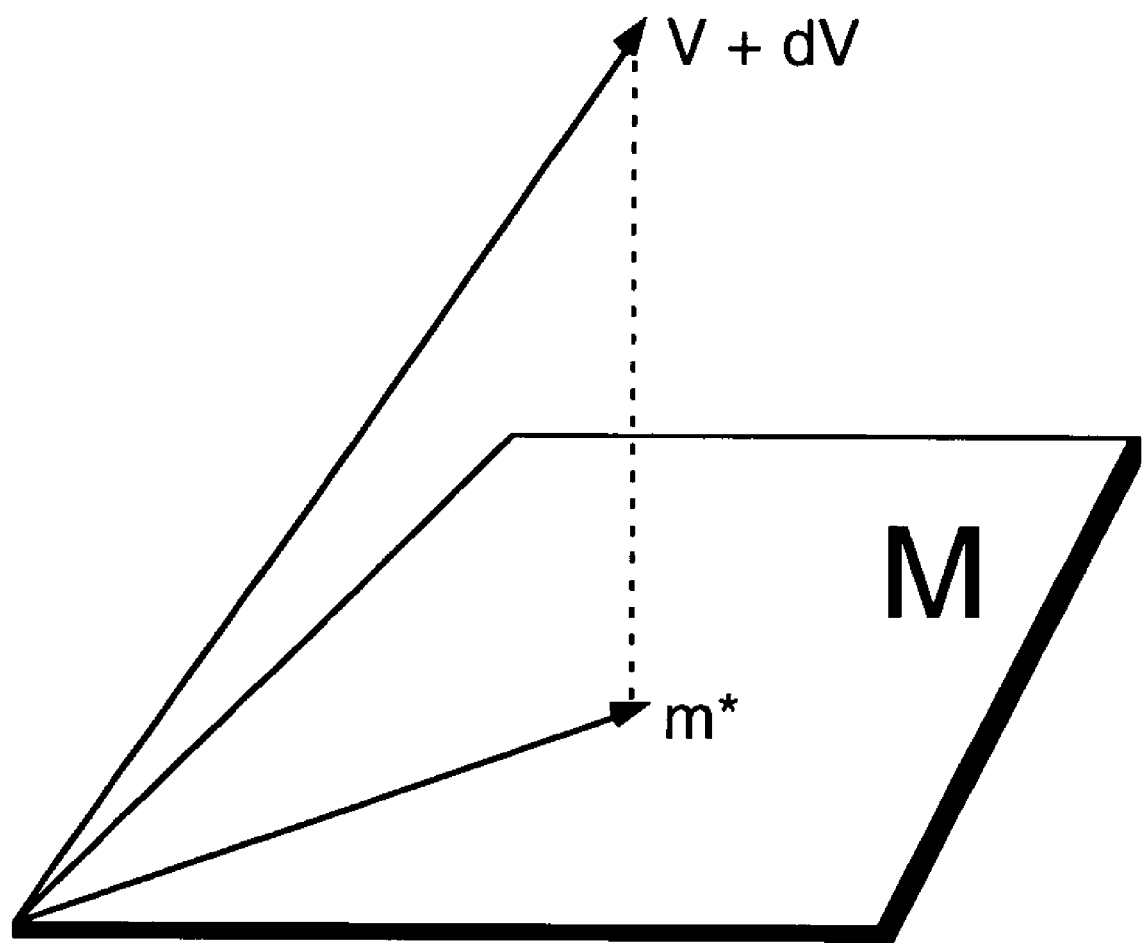
FIG. 3 is a schematic diagram illustrating the projection of V+dV onto the space M.

At a fixed time t we define the space M as the linear space generated by all instantaneous marketed returns $(dx_i)/x_i$. That is, M is made up of all linear combinations of those instantaneous returns. Symbolically, the value of our $V(x_e, t)$ will satisfy $$V(x_e, t) = P\{V(x_e, t) + dV(x_e, t) | M\}. \quad (18)$$

which denotes the discounted projection P onto the space M of instantaneous marketed returns. Specifically, $V(x_e, t)$ is found by: first calculating the payoff m* at time t+dt in M that is closest to $V(x_e, t) + dV(x_e, t)$ in the sense of minimizing the expected square of their difference; and second, computing the price at time t of m* (which is defined by linearity since it is a combination of marketed returns). Briefly, we say that the value at t of the payoff at t+dt is given by discounted instantaneous projection. This process of projection onto M is illustrated schematically in FIG. 3.

Since payoff $V(x_e, t)$ at t+dt is certain, its price at t is the discounted value $(1-rdt)V(x_e, t)$. Thus (18) becomes $$rV(x_e, t)dt = P\{dV(x_e, t) | M\}. \quad (19)$$

We shall only keep terms that are first-order in dt. Hence, in particular, $P\{dt\} = dt$. Substituting the Ito formula $$dV(x_e, t) = \left[V_t(x_e, t) + V_{x_e}(x_e, t)\mu_e x_e + \frac{1}{2}V_{x_e x_e}\sigma_e^2 x_e^2\right]dt + V_{x_e}\sigma_e x_e dz_e \quad (20)$$

into (19) and keeping only first-order terms in dt, (19) becomes $$rV(x_e, t)dt = \left[V_t(x_e, t) + V_{x_e}(x_e, t)\mu_e x_e + \frac{1}{2}V_{x_e x_e}\sigma_e^2 x_e^2\right]dt + V_{x_e}\sigma_e x_e P\{dz_e | M\}. \quad (21)$$

The projection of $dz_e$ is a linear combination of r dt and the differential of a marketed asset most correlated with $dx_e$. A marketed asset $x_c$ with instantaneous return $dx_c/x_c$ most correlated with $dx_e/x_e$ satisfies $dx_c = \mu_c x_c dt + \sigma_c x_c dz_c$ where $\mu_c$ and $\sigma_c$ are each formed as (identical) linear combinations of the $\mu_i$'s and $\sigma_i$'s, respectively. $z_c$ is a standardized Wiener process.

Standard methods show that the projection of $dz_e$ onto M is $\rho_{ec} dz_c$. In addition, from $$x_c = P\{x_c + \mu_c x_c dt + x_c \sigma_c dz_c\}$$

it follows that $$P\{dz_c\} = \frac{(r - \mu_c)}{\sigma_c} dt. \quad (22)$$

Substituting this in (21) produces $$rV(x_e, t)dt = \left[V_t(x_e, t) + V_{x_e}(x_e, t)\mu_e x_e + \frac{1}{2}V_{x_e x_e}(x_e, t)\sigma_e^2 x_e^2\right]dt + V_{x_e} P\{\rho_{ec}\sigma_e x_e dz_c\}$$

$$= \left[V_t(x_e, t) + V_{x_e}(x_e, t)x_e[\mu_e - \beta_{ec}(\mu_c - r)] + \frac{1}{2}V_{x_e x_e}(x_e, t)\sigma_e^2 x_e^2\right]dt,$$

where we define $$\beta_{ec} \equiv \frac{\sigma_{ec}}{\sigma_c^2} = \frac{\rho_{ec}\sigma_e}{\sigma_c} \quad (23)$$

Canceling the dt we have the final result $$rV(x_e, t) = V_t(x_e, t) + V_{x_e}(x_e, t)x_e[\mu_e - \beta_{ec}(\mu_c - r)] + \frac{1}{2}V_{x_e x_e}(x_e, t)\sigma_e^2 x_e^2. \quad (24)$$

This is the basic extended Black-Scholes equation.

Once equation (24) is solved with the boundary conditions $V(x_e, t) = F(x_e)$, $V(0, t) = e^{-r(T-t)}F(0)$, the value $V(x_e(0), 0)$ is the value at time 0 of the derivative.

Market Representatives

Details of how the two basic alternative market representatives, a most-correlated asset and the Markowitz portfolio, are computed are given here. In practice, these detailed calculations are greatly simplified (approximated) by use of intuition or equilibrium arguments, as mentioned below.

1. Most-Correlated Asset.

Arrange the n marketed assets so the first n−1 are risky and the n-th is risk free. The return of a most-correlated asset is of the form $$\frac{dx_c}{x_c} = \sum_{i=1}^{n-1} \alpha_i \frac{dx_i}{x_i}, \qquad (25)$$

where the $\alpha_i$'s do not necessarily sum to 1.

To maximize the correlation of this return with $dx_e$, the $\alpha_i$'s solve $$\max E\left(\frac{dx_c}{x_c}\frac{dx_e}{x_e}\right)$$
$$\text{subject to } \operatorname{var}\left(\frac{dx_c}{x_c}\right) \le 1.$$

Introducing a (positive) Lagrange multiplier for the constraint, and representing $dx_c/x_c$ in terms of the $\alpha_i$'s, this is equivalent to solving $$\max\left[\sum_{i=1}^{n-1} \alpha_i \sigma_{ie} - \lambda \sum_{ij}^{n-1} \alpha_i \sigma_{ij} \alpha_j\right]. \qquad (26)$$

Since any solution can be scaled by an arbitrary positive constant and still preserve the property of being most correlated, without loss of generality one may set $\lambda=1$. Then (26) becomes $$\sum_{j=1}^{n-1} \sigma_{ij} \alpha_j = \sigma_{ei} \qquad (27)$$

which is easily solved.

The current price (at t) of $dx_c/x_c$ is $$\sum_{i=1}^{n-1} \alpha_i.$$

To make the price equal to 1, the $\alpha_i$'s are scaled so that they do sum to 1. Then the correct $x_c$ is given by (25) with the scaled $\alpha_i$'s.

In practice, a market representative may be chosen as an asset that is obviously closely related to the variable $x_e$. For example, an orange juice future is closely related to grapefruit price. It is probably not necessary to consider oil and metal futures or the thousands of marketed stocks to find a closely related market representative. A refined approach is to consider a family of agricultural futures and, based on historical returns, compute the most-correlated portfolio from this family. The selection of a closely related market representative is, in practice, partially art and partially data collection and computation.

2. Markowitz portfolio. The Markowitz portfolio $x_M$ has the advantage that it can be used to price a derivative of any process $x_e$, but its disadvantages are that is difficult to use, less intuitive, may not exist, and does not lead to an optimal replication. (The use of this portfolio in the single-period case is described in Luenberger [10].) The Markowitz portfolio $x_M$ is the portfolio of purely risky assets (the first n–1 assets) that has price 1 and maximizes $$\frac{\mu_M - r}{\sigma_M}.$$

If it exists, the set of $\alpha_j$'s that achieves it satisfies $$\sum_{i=1}^{n-1} \sigma_{ij} \alpha_j = c(\mu_i - r) \qquad (28)$$

for the constant c that makes the $\alpha_i$'s sum to 1. This portfolio is an alternative for purposes of valuation only, not for determining optimal replication or hedging. In practice, a broad market index, such as the S&P 500, is used as a proxy for the Markowitz portfolio.

3. Local index. Suppose $x_{e1}$ and $x_{e2}$ are non-marketed underlying variables and $x_{c1}$ and $x_{c2}$ are the respective most-correlated marketed assets. The Markowitz combination of $x_{c1}$ and $x_{c2}$ is the portfolio $x_m = \alpha_1 x_{c1} = \alpha_2 x_{c2}$ where the weights $\alpha_1$ and $\alpha_2$ are determined as in the above discussion of the Markowitz portfolio under the assumption that $x_{c1}$, $x_{c2}$ and r are the only marketed assets. This $x_m$ is a market representative for any derivative of $x_{e1}$ and $x_{e2}$. It serves as a local index, and may in practice be the index of an industry to which $x_{e1}$ and $x_{e2}$ are related. This local index can be used to value a variety of derivatives. It cannot be used as the basis for optimal hedging, but it can be used to form approximate hedges. The method extends to any number of underlying variables.

Important Special Case

If the payoff is a put or call option on the variable $x_e$, a closed-form expression for the solution to (15) applies, which extends the special case solved by Black and Scholes. If the strike price of the call option is K, the payoff is $\max[(x_e - K, 0]$. The value of the call option is $$V(x_e, t) = x_e e^{[(\omega-r)(T-t)]} N(d_1) - Ke^{-r(T-t)} N(d_2) \qquad (29)$$

where N(d) denotes the value of the standard normal distribution at amount d, and $$d_1 = \frac{\ln(x_e/K) + \left(w + \frac{1}{2}\sigma_e^2\right)(T-t)}{\sigma_e \sqrt{T-t}} \qquad (30)$$

$$d_2 = d_1 - \sigma_e \sqrt{T-t} \qquad (31)$$

$$\omega = \mu_e - \beta_{em}(\mu_m - r), \qquad (32)$$

where $\mu_m$ is the drift rate of the market representative $x_m$ and $\beta_{em}$ is the beta of $x_e$ and $x_m$.

The value of a put with strike price K can be found from an extended put-call parity formula $$C - P + Ke^{-rT} = x_e e^{(\omega-r)T}. \qquad (33)$$

Here C is the price of the call, and P the price of the put.

Optimal Replication

It is possible to optimally replicate the final payoff by trading in the marketed assets. The replication is imperfect, but the error has zero expected value and is uncorrelated with all marketed assets. This is, therefore, the best that can be done within a mean-variance framework. The trading strategy for replication can be derived from the value function.

As in (20), the value function follows the Ito process $$dV(x_e, t) = \left[V_t(x_e, t) + V_{x_e}(x_e, t)\mu_e x_e + \frac{1}{2}V_{x_e x_e}(x_e, t)\sigma_e^2 x_e^2\right]dt + V_{x_e}\sigma_e x_e dz_e. \quad (34)$$

One may write $$dz_e = \rho_{ec}dz_c + \sqrt{1-\rho_{ec}^2}\, dz_p, \quad (35)$$

where $dz_p$ is a standardized Wiener process uncorrelated with all marketed assets and where $\rho_{ec} = \sigma_{ec}/(\sigma_e\sigma_c) = \beta_{ec}\sigma_c/\sigma_e$. With this substitution and substitution of the term $$\frac{1}{2}V_{x_e x_e}(x_e, t)\sigma_e^2 x_e^2$$

from the extended Black-Scholes equation (15) it is possible to transform (34) to $$dV(x_e, t) = [(V(x_e, t) - \phi)r + \phi\mu_c]dt + \phi\sigma_c dz_c + \delta dz_p, \quad (36)$$

where $$\phi(x_e, t) = V_x(x_e, t)x_e\beta_{ec} \quad (37)$$

$$\delta(x_e, t) = V_{x_e}(x_e, t)\sigma_e x_e\sqrt{1-\rho_{ec}^2}. \quad (38)$$

Motivated by (36), the process H is defined by $$dH(x_e, t) = [(H(x_e, t) - \phi)r + \phi\mu_c]dt + \phi\sigma_c dz_c, \quad (39)$$

with initial condition $H(x_e, 0) = V(x_e, 0)$.

From (39) it is clear that $dH(x_e, t)$ is in M at $(x_e, t)$ and that, overall, $H(x_e, t)$ is generated by linear combinations of marketed returns. From $$d(V-H) = r(V-H)dt + \delta dz_p, \quad (40)$$

and the initial condition $V-H=0$, it is clear that at time 0 there holds $E[V(x_e, t) - H(x_e, t)] = 0$ for all $t$, $0 \le t \le T$. Furthermore, since $V-H$ is a linear integral of $dz_p$'s, it is orthogonal (that is, uncorrelated) with all marketed returns. Thus the random variable $H(x_e, T)$ as seen at time 0 is the projection of $V(x_e, T)$ onto the space of marketed assets over $0 \le t \le T$.

It follows that the optimal replication is simply H, governed by (39). This replication requires only initial cash of $V(x_e, 0)$ and no other infusions or withdrawals. At each instant $H - \phi$ is invested in the risk free asset and $\phi$ in the most-correlated asset (for a total of H). Holding $-H$ serves to optimally hedge the derivative.

Projection Error

The variance of the residual replication error $V-H$ at T can be found as a solution to a partial differential equation adjunct to the general pricing equation.

Define the difference variable $D = V - H$, and let $U = e^{r(T-t)}D$. Then from (40)

$$\begin{aligned}dU &= -re^{r(T-t)}DdT + e^{r(T-t)}dD \\ &= \{-re^{r(T-t)}D + e^{r(T-t)}rD\}dt + e^{r(T-t)}\delta(x_e, t)dz_p \\ &= \delta^*(x_e, t)dz_p,\end{aligned} \quad (41)$$

where $\delta^*(x_e, t) = e^{r(T-t)}\delta(x_e, t)$.

Let $S(x_e, t)$ be the variance of $U(T)$ when in (41) U is initiated with $U=0$ at the point $(x_e, t)$. This variance is $$S(x_e, t) = E\left[\int_t^T \delta^*(x_e(s), s)^2 ds\right], \quad (42)$$

where E denotes expectation at t.

We write (42) as $$\begin{aligned}S(x_e, t) &= \delta^*(x_e, t)^2 dt + E\left[\int_{t+dt}^T \delta^*(x_e(s), s)^2 ds\right] \\ &= \delta^*(x_e, t)^2 dt + E[S(x_e, t) + dS(x_e, t)].\end{aligned} \quad (43)$$

Hence, $$E[dS(x_e, t)] + \delta^*(x_e, t)^2 dt = 0. \quad (44)$$

Expanding (44) using Ito's lemma, we find $$S_t(x_e, t) + S_{x_e}\mu_e x_e + \frac{1}{2}S_{x_e x_e}\sigma_e^2 x_e^2 + e^{2r(T-t)}[V_{x_e}(x_e, t)\sigma_e x_e]^2(1 - \rho_{ec}^2) = 0, \quad (45)$$

with boundary condition $S(x_e, T) = 0$. The value $S(x_e, 0)$ is the variance of the replication error at T, as seen at $t=0$.

Universality

As a by-product of the optimal replication equations, we obtain a compelling justification for methods used in embodiments of this invention. When the new asset is priced according to teachings of this invention, the optimal replication H has the same expected value as the asset with payoff $F(x_e(T))$. In addition the optimal replication has lower variance than the asset since $V(x_e, T) = H(x_e, T) + \text{error}$, where the error is uncorrelated with all marketed assets. This means that every risk-averse investor will prefer the replication over the new asset. This property is termed universality, to reflect that it is true for everyone. Another way to state this property is that if the new asset is priced according to methods of this invention, every risk-averse investor will elect to include the asset only at the zero level (preferring neither to be long or short the asset). In this sense, the price renders the asset irrelevant in the market, for it is dominated by the best replicating asset which is already available.

Risk-Neutral Process

These methods can be transformed to formulas based on a risk-neutral processes. The novel feature is that the risk-neutral process is defined in terms of a market representative $x_m$ defined earlier. The appropriate risk-neutral process is $$dx_e = \omega x_e dt + \sigma_e x_e dz_e \quad (46)$$

where $$\omega = \mu_e - \beta_{em}(\mu_m - r). \quad (47)$$

In these terms the proper price of the payoff $F(x_e(T))$ is $$p = e^{-rT}\hat{E}[F(x_e(T))] \quad (48)$$

where $\hat{E}$ denotes expectation at time 0 with respect to the risk-neutral process. One way to solve such a problem is by simulation. Many paths of $x_e$ are generated according to the risk-neutral process and the resulting terminal payoffs are averaged to obtain an estimate of the risk-neutral expected value. The discounted value of this estimate converges to the correct price as the number of simulation runs increases.

A significant advantage of the risk-neutral process is that it can be used to value path-dependent cash flows; where the payoff depends on the particular path taken by $x_e$ as well as its final value. For example, the Asian option with payoff max $[\max_{0 \le t \le T} x_e(t) - K, 0]$ can be evaluated using the risk-neutral process. The proper price is again $$p = e^{-rT}\hat{E}[F(x_e(T))],$$

which can be evaluated most easily by simulation, but also by special grid methods.

DETAILED DESCRIPTION OF THE INVENTION: DISCRETE-TIME CASE

Approximation

One way to work in a discrete-time framework is to directly discretize the model and the partial differential equations. For example, the new version of the process for $x_e$ becomes $$x_e(k+1) = (1 + \mu_e \Delta t)x_e + \sigma_e x_e \notin(k)\sqrt{\Delta t}. \quad (49)$$

In this equation $\Delta t$ is the length of the time step of the model and $\notin(k)$ is the value of a standardized normal random variable uncorrelated with previous or future such variables. The market variables are transformed to discrete form in a similar way. A corresponding discrete-time version of the extended Black-Scholes equation can be developed. It is $$V_{k-1}(x_e(k-1)) = \frac{1}{R}\left\{E\left[V_k(x_e(k)) - \frac{cov(V_k(x_e(k))(E[x_m(k)] - Rp_m)}{\sigma_m^2}\right]\right\} \quad (50)$$

where $R = e^{r\Delta t}$ and where $x_m$ is the market representative (either the Markowitz portfolio or a most-correlated market asset or a combination of these.) The expected values are taken at time k−1. The quantity $p_m$ is the price at time k−1 of $x_m$, $\sigma_m^2$ is the variance of $x_m(k)$ as seen at k−1. The formula is valid for any discrete process that governs $x_e$, although the market variables follows a fixed process as in (49) (but with i's instead of e as subscripts). The extensions applicable in the continuous-time framework are also applicable in discrete time.

The discrete-time approximation (49) can be converted to risk-neutral form as $$x_e(k+1) = (1 + \omega \Delta t)x_e + \sigma_e x_e \notin(k)\sqrt{\Delta t}, \quad (51)$$

where $\omega = \mu_e - \beta_{em}(\mu_m - r)$.

Finite-State Models

Figure 4:
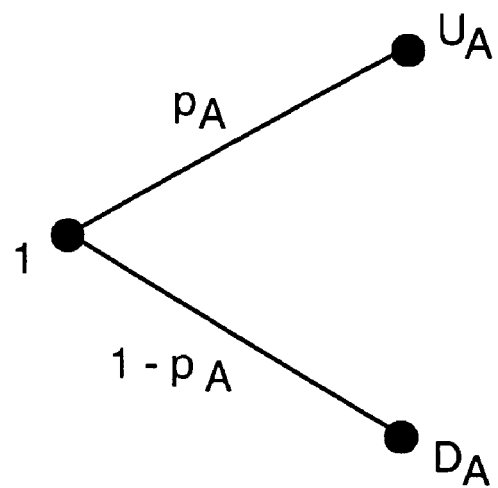
FIG. 4 shows a single step of a binomial model of variable A with probabilities $p_A$ and $1-p_A$.

A single stochastic variable A is represented by the two-state model shown in FIG. 4. The $U_A$ outcome is considered an "up" move, and the $D_A$ outcome a "down" move. The model has three degrees of freedom (one probability and two node values) and hence the expected value and variance of the variable can be matched with one remaining degree of freedom. The model can be extended over several time periods as a binomial tree or (frequently) a binomial lattice.

There are two standard approaches to parameter matching: additive and geometric, corresponding to matching moments of the variable itself or matching moments of the logarithm of the payoff. Geometric matching is a natural choice for processes governed by geometric Brownian motion. Additive matching is frequently used for discrete-time models. A binomial model for one of these is easily converted to a corresponding binomial model for the other. For small $\Delta t$ defining the time step of the model, the two approaches are nearly identical.

Suppose that A and B are variables as above, and suppose G is a function of (a derivative of) B. G is defined by the two values $G_u$ and $G_d$ corresponding to whether $U_B$ or $D_B$ occurs. There is an important relation between the covariance of such a derivative with A and the covariance of B with A that holds when B is described by a binomial model. This is spelled out in the following result, easily proved by algebra:

$$cov(A, G) = \frac{(G_u - G_d)}{(U_B - D_B)}cov(A, B). \quad (52)$$

Suppose A is the market asset most correlated with B. The above result guarantees that in the case of binomial models, A is also most-correlated to all derivatives of B (since the two covariances are proportional). It follows that the three-variable model (with A, B, and the risk free total return R) can be used to price all derivatives of B.

Paralleling the development for the continuous-time case, A is a market representative and it may be taken to be a marketed asset most-correlated with the underlying B or, alternatively, as the Markowitz (market) portfolio.

Let G be a derivative of B, defined by its two values $G_u$ and $G_d$. The projection price is (with an over-bar on a random variable denoting expected value)

$$v_G = \frac{1}{R}[E(G) - cov(G, A)(\overline{A} - v_A R)/\sigma_A^2] \quad (53)$$

$$= \frac{1}{R}[p_B G_u + (1 - p_B)G_d - [cov(1(U_B), A)G_u + cov(1(D_B), A)G_d][\overline{A} - v_A R]/\sigma_A^2]$$

$$= \frac{1}{R}\{[p_B - \beta_{1(U_B),A}[\overline{A} - v_A R]G_u + [(1 - p_B) - \beta_{1(D_B)}[\overline{A} - v_A R]]G_d\},$$

where $1(U_B)$ and $1(D_B)$ denote payoffs of 1 if $U_B$ or $D_B$, respectively, occurs; and where $$\beta_{1(U_B),A}=\text{cov}[1(U_B),A]/\sigma_A^2.$$

This can be written as $$V_G = \frac{1}{R}[q_B G_u + (1-q_B)G_d] \quad (54)$$

where $$q_B = p_B - \beta_{1(U_B),A}[\bar{A}-v_A R]. \quad (55)$$

Expanding the beta term, we can calculate explicitly $$q_B = p_B - p_B(1-p_B)[A_u-A_d][\bar{A}-v_A R]/\sigma_A^2, \quad (56)$$

where $A_u=E[A|U_B]$ $A_d=E[A|D_B]$.

Figure 5:
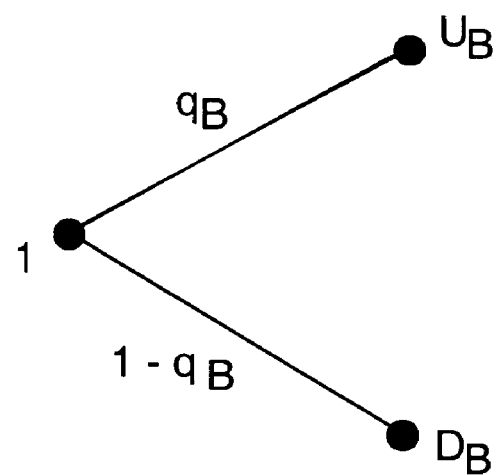
FIG. 5 shows a single step of a binomial model of a variable B when converted to risk-neutral form with risk-neutral probabilities of $q_B$ and $1-q_B$.

This is the basic method for the discrete-time case. The unique feature is the formula (55) or (56) for the risk-neutral probability of an up move. Once this probability is determined, it may be used in place of the true probability $p_A$ for the purpose of evaluating payoffs that depend on B. In other words, for purposes of evaluation the binomial model takes the form of FIG. 5.

Recursive Solution

The single-period structure can be extended to a multiple-period framework by piecing together single periods, and this leads to a recursive solution.

Suppose the nodes of the lattice are numbered by the time index k and the state index $s_k$ which is the level of the node counting from the bottom. Briefly, we write the node as $(k, s_k)$. The value function of the derivative is a value at each node, and described as $V_k(s_k)$ at time point k and state $s_k$.

The recursive solution is $$V_{k-1}(s_{k-1}) = \frac{1}{R}[q_B V_k(s_{k-1}^u) + (1-q_B)V_k(s_{k-1}^d)], \quad (57)$$

where $s_{k-1}^u$ denotes the upper successor state to $s_{k-1}$ and $s_{k-1}^d$ denotes the lower successor state to $s_{k-1}$. The process is started with the terminal boundary condition specifying the payoff of the derivative G. If there are additional payoffs along the way, they are incorporated step by step in the usual manner.

This method can be extended in the same ways as the continuous-time version.

Figure 6:
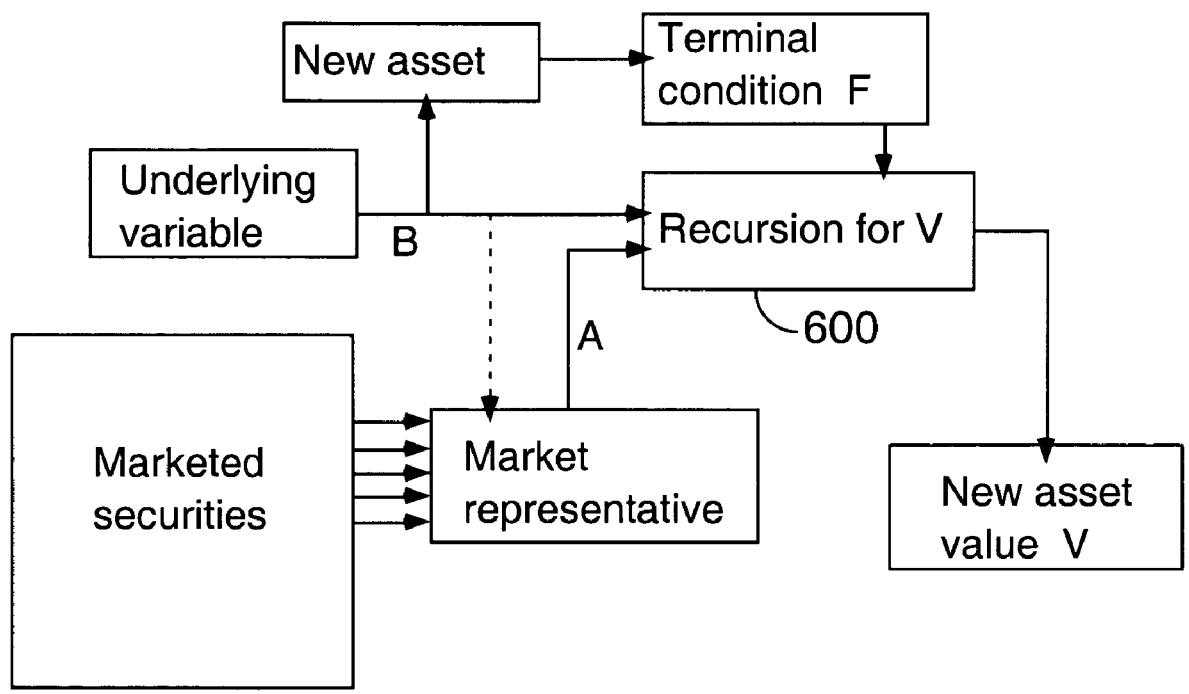
FIG. 6 presents a schematic of the method for the discrete-time case. It shows the key variables and how they combine to produce the value of the derivative of the underling variable B.

FIG. 6 is a schematic depiction of the method for the discrete-time case. This schematic has the same basic structure as that of FIG. 1 which depicts the schematic for the continuous-time case, with the exception that the variable V is found through a recursion process 600. The figure shows how the underlying variable B defines the new asset and how the market representative A is extracted from the market. The properties of these two variables define $q_B$ which defines the recursion, leading to the value of the new asset.

Error Process

Denote by $\{V_k|M\}$ the projection of $V_k$ on the market at time k−1. This will be the projection of $V_k$ onto the space spanned by R and a market representative A most correlated with B. It is easily shown that $$\{V_k|M\}=\bar{V}_k+\text{cov}(V_k,A)(A-\bar{A})/\sigma_A^2.$$

Hence $$V_k=\bar{V}_k+\text{cov}(V_k,A)(A-\bar{A})/\sigma_A^2+\notin_k, \quad (58)$$

where $\notin_k$ is uncorrelated with the market. Using the pricing equation (50), one has $$RV_{k-1}=\bar{V}_k+\text{cov}(V_k,A)(R-\bar{A})/\sigma_A^2.$$

Eliminating $\bar{V}_k$, (58) can be written as $$V_k = RV_{k-1} - \text{cov}(V_k,A)(R-\bar{A})/\sigma_A^2 + \text{cov}(V_k,A)(A-\bar{A})/\sigma_A^2 + \epsilon_k \quad (59)$$
$$= [(1-\gamma)R + \gamma A]V_{k-1} + \epsilon_k$$

where $$\gamma=\text{cov}(V_k/V_{k-1},A)/\sigma_A^2.$$

In the same manner as in the continuous-time case this shows how to select the best approximating (or replicating) portfolio H, with an amount $H_{k-1}-\gamma V_{k-1}$ in the risk free asset and $\gamma V_{k-1}$ in the portfolio A (for a total of $H_{k-1}$). Thus H satisfies the recursion $$H_k=(H_{k-1}-\gamma V_{k-1})R+\gamma V_{k-1}A+\notin_k. \quad (60)$$

Error Propagation

The replication error $D_k \equiv V_k-H_k$ satisfies $$D_k=RD_k+\in_k \quad (61)$$

where $\in_k$ is uncorrelated with the market and $$\in_k=V_k-\bar{V}_k-\text{cov}(V_k,A)(A-\bar{A})/\sigma_A^2. \quad (62)$$

It follows that $$\text{var}(\in_k)=\text{var}(V_k)-\text{cov}(V_k,A)^2/\sigma_A^2. \quad (63)$$

In terms of the lattice parameters this becomes $$\text{var}(\epsilon_k) = \left\{p_A(1-p_A) - \frac{\text{cov}(A,B)^2}{(U_B-D_B)^2\sigma_A^2}\right\}[V_k^u - V_k^d]^2. \quad (64)$$

If the dynamics of the variables A and B are stationary, the expression in brackets is constant, and hence the error variance is simply a constant times the square of the difference in the two successor $V_k$'s.

Let $U_k=R^{T-k}D_k$. Then $U_k=U_{k-1}+R^{T-k}\in_k$. If $S_k$ is the variance of $U_T$ as seen starting at k, then $$S_{k-1}=E[S_k]+R^{2(T-k)}\text{var}(\in_k) \quad (65)$$

with terminal condition $S_T=0$. This can now be evaluated by a backward recursion in the lattice.

Method Steps

Figure 7:
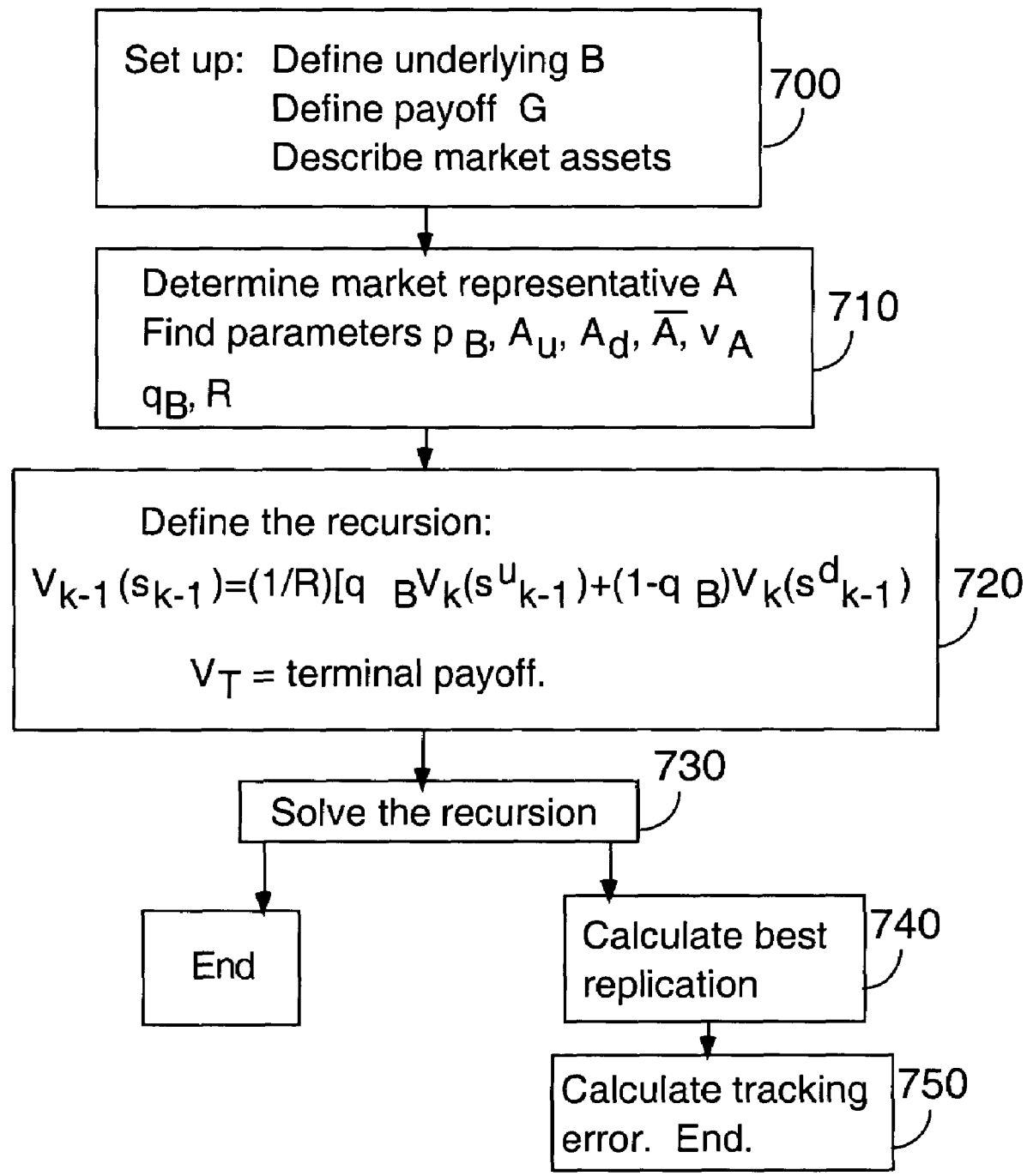
FIG. 7 is a flow diagram showing the steps of the method in the discrete-time case.

Following is a summary of the steps of the lattice method for the discrete-time case. These steps are depicted in FIG. 7 and parallel those for the continuous-time case illustrated in FIG. 2.

1. Step 700 is the set up. Given a random payoff G that depends on a non-traded variable B that evolves randomly, formulate a binomial lattice model.
2. Step 710 determines an appropriate market representative A as either (a) a market asset most correlated to B or (b) the Markowitz or market portfolio.
3. Step 720 determines the risk-neutral probabilities by using the formula (56).

4. Step 730 solves for the values of V on the lattice corresponding to the variable B using the recursion (57). Initiate with the terminal boundary condition V=G. The result at time 0 is the price.
5. Optionally, step 740 determines the optimal replicating portfolio from $H_0=V_0$, and thereafter at step k−1 investing $H_{k-1}-\gamma V_{k-1}$ in the risk free asset and $\gamma V_{k-1}$ in the asset most correlated with B.
6. Optionally, step 700 determines the error variance by the backward recursion (65).

Implementation

The present invention may be implemented in various different ways on a computer. For the purposes of the present description, the term 'computer' is defined to include any electronic digital information processor, including hand-held calculators, personal data assistants, pocket personal computers, laptop computers, desktop computers, and so on. The computer may be programmed by providing a computer readable digital storage medium containing instructions to execute various methods of the invention. The program or programs are then executed on the computer. Information associated with the variable $x_m$ may be provided to the computer manually by a user, received from a data network, or retrieved from a storage medium into computer memory. The program then retrieves the information associated with the variable $x_m$ from the computer memory and performs calculations in accordance with various methods of the invention. The results of the calculations may be used to display or otherwise communicate information to the user, or they may be stored or transmitted digitally for further processing or later display.

More specifically, the implementation of methods of the invention may take various different forms. Following are representative examples of specific implementations.

1. Numerical Solution. The straightforward way to implement the continuous-time method once the model is defined is by solution of the extended Black-Scholes equation (15). This can be carried out by standard numerical procedures, following the methods developed for the ordinary Black-Scholes equation. The simple, one-dimensional version shown explicitly in (15) can be solved by a finite grid method: a large two-dimensional grid of points is defined with coordinates corresponding to $x_e$ and t and grid point values corresponding to the associated V values. In the simplest method, first-order derivatives of V are formed as (normalized) differences in grid point values. The second-order derivative is the second-order difference of grid point values. Boundary conditions are typically imposed at t=T, and at lower and upper values of $x_e$. In practice, if the problem is defined for all values of $x_e$ with $0 \leq x_e \leq \infty$, an appropriate value for $V(x_e, t)$ at a high upper boundary curve $\bar{x}_e(t)$ is assigned as a boundary condition in addition to the terminal condition and the condition at $x_e=0$. It is possible to carry out the complete solution with a spreadsheet program such as Excel running on a general purpose computer. Experience has shown that the primary technical concern for simple methods such as this is that the time step between successive grid points be small in order to assure convergence. Small grid point widths in both x and t are used to get good accuracy.

For higher-order equations associated with extensions of the basic method, it is convenient to use a professional software package or one written in a programming language. The value of a call option on a non-tradable variable, but with a stochastically varying interest rate has been solved by the inventor using the Excel Visual Basic package.

The same techniques may be applied to solve for the variance according to the partial differential equation (45). In simple experiments, the same grid size as used for finding V worked for finding the non-hedgable variance.

2. Explicit Solution. The explicit solution for call options (or for puts using the put-call parity formula) is easily solved by using either a table, or more likely, an approximate formula for values of the normal distribution. Again this can be carried out with Excel. It could be easily incorporated into a hand-held calculator.
3. Discrete-time Version. The discrete time recursion is easily carried out by direct recursion. This method is relatively free from convergence issues, since both the model and the solution method are carried out with the same time steps (unlike the continuous-time case which is computed with a discrete process).
4. Lattice Methods. The lattice method is easily implemented. In simple cases it may be carried out with a spreadsheet program running on a computer. The method becomes more challenging to implement when the model parameters are not constant, and when higher-order lattices and trees are used.
5. Risk-Neutral Computation. Beginning with a discrete model, the risk-neutral version of the processes can be implemented computationally by computing the risk-neutral expected value of the payoff function. This can be carried out with backward recursion, simulation, or by constructing a lattice that has the risk-neutral probabilities on its arcs and using backward recursion on that lattice.
6. Simulation. Simulation is a powerful method for implementing methods of this invention. Standard simulation packages can be used, such as a spreadsheet program like Excel, modest simulation packages such as Crystal Ball, or more advanced statistical packages. At a professional level, special software that accounts for the financial structure as well as advanced simulation concepts would be used.
7. Optimization. In many situations, on-going decisions can be made that influence the value of the payoff. For example, an American-style option allows the owner to exercise the option at any time before expiration, and selection of this exercise policy is an important component of the analysis of the option. Similarly, in a business venture there are opportunities to expand, contract, delay, and so forth. These policies can be found with the methods of this document in conjunction with standard methods for policy optimization employed for ordinary derivative theory.

REFERENCES

[1] Sharpe, W. F. "Capital Asset Prices: A Theory of Market Equilibrium under Conditions of Risk," *Journal of Finance*, 19, 425-442, 1964.
[2] Black, F., and M. Scholes, "The Pricing of Options and Corporate Liabilities,"*Journal of Political Economy* 81, 637-654, 1973
[3] Föllmer, H, and D. Sondermann, "Hedging of Non-Redundant Contingent-Claims," in Werner Hildenbrand and Andrew Mas-Colell, eds., *Contributions to Mathematical Economics, in Honor of Gérard Debreu*, Amsterdam, North-Holland, 1986, 205-23.

[4] Davis, M. H. A. "Option Pricing in Incomplete Markets," in M. A. H. Dempster and S. Pliska, eds, *Mathematics of Derivative Securities*, Cambridge University Press, Cambridge, 1997, 216-26.

[5] Bertsimas, D, L. Kogan, and A. W. Lo, "Pricing and Hedging Derivative Securities in Incomplete Markets: An ∉-Arbitrage Approach," Massachusetts Institute of Technology working Paper #LFE-1027-97, June 1997.

[6] Merton, R. C. "Applications of Options Pricing Theory: Twenty-five years later." *American Economic Review*, 88 323-349. (1998)

[7] He, H, and N. D. Pearson, "Consumption and Portfolio Policies with Incomplete Markets and Short-Sale Constraints": The Infinite Dimensional Case," *Journal of Economic Theory*, 54, 259-304, (1991)

[8] Schwartz, Eduardo S. and Mark Moon, "Rational Pricing of Internet Companies," *Financial Analysts Journal*, May/June 2000, 62-75.

[9] Luenberger, D. G. "Projection Pricing," *Journal of Optimization Theory and Applications*, April 2001, 1-25.

[10] Luenberger, D. G., "A Correlation Pricing Formula", *Journal of Economic Dynamics and Control*, Jul. 26, 2002, 1113-1126.

[11] Holtan, H. M. "Asset Valuation and Optimal Portfolio Choice in Incomplete Markets," Ph. D. Dissertation, Department of Engineering-Economic Systems, Stanford University, August 1997.

[12] Schweizer, M. "A Guided Tour through Quadratic Hedging Approaches," in *Handbook in Mathematical Finance: Option Pricing, Interest Rates and Risk Management*, E. Jouini, J. Civitanić, M. Musiela, eds. Cambrige University Press, Cambridge, 538-574, 1999.

[13] Luenberger, D. G. "Arbitrage and Universal Pricing," to appear in the *Journal of Economic Dynamics and Control*.

[14] Heath, D., E. Platen, and M. Schweizer, "A Comparison of Two Quadratic Approaches to Hedging in Incomplete Markets," *Mathematical Finance*, Oct. 11, 2001, 385-413.

[15] Luenberger, D. G. "Pricing Derivatives of a Non-Tradable Asset in Discrete Time", In preparation.

Patents

| 5,692,233 | Nov. 25, 1997 | Garman | 705/36 |
| 6,173,276 | Jan 9, 2001 | Kant, et al | 706/50 |

What is claimed is:

1. A method implemented on a computer for pricing a financial derivative of a non-marketed variable $x_e$, the method comprising:

retrieving from a storage medium into memory of the computer information associated with the non-marketed variable $x_e$, and a market representative $x_m$, wherein the market representative $x_m$ is useful in determining a value of the financial derivative;

calculating on the computer a solution to an equation involving a price of the financial derivative $V(x_e, t)$ defined as a function of $x_e$ and time t, wherein the equation comprises a coefficient involving the information associated with $x_e$ and $x_m$; and generating on the computer an output including the calculated price of the financial derivative;

wherein the information associated with $x_e$ and $x_m$ comprises a drift rate of the non-marketed variable $x_e$, and a drift rate of the market representative $x_m$;

wherein the information associated with $x_e$ and $x_m$ further comprises variances of the non-marketed variable $x_e$ and the market representative $x_m$, and a covariance between the non-marketed variable $x_e$ and the market representative $x_m$;

wherein the coefficient involving the information associated with $x_e$ and $x_m$ has the form $\mu_e - \beta_{em}(\mu_m - r)$, where $\mu_e$ is a drift rate of the non-marketed variable $x_e$, $\mu_m$ is a drift rate of the market representative $x_m$, and $\beta_{em}$ is a factor derived from a variance of the market representative $x_m$ and a covariance between the non-marketed variable $x_e$ and the market representative $x_m$;

wherein the market representative $x_m$ comprises a marketed asset or combination of such assets that is approximately most correlated with the non-marketed variable $x_e$;

wherein the equation is an extended Black-Scholes equation obtained from a standard Black-Scholes equation by replacing, in a term involving a first-order partial derivative of $V(x_e, t)$ with respect to $x_e$, a coefficient r, representing an interest rate, by the coefficient involving the information associated with $x_e$ and $x_m$.

2. The method of claim 1 wherein the equation is a discrete-time equation involving $V(x_e, t)$ defined as a function of $x_e$ and discrete time points t=k.

3. The method of claim 1 wherein the market representative $x_m$ comprises a combination of multiple marketed assets associated with market sectors most closely associated with the non-marketed variable $x_e$.

4. The method of claim 1 wherein the market representative $x_m$ comprises a marketed asset or combination of such assets that is approximately equal to an overall market portfolio.

5. The method of claim 1 further comprising calculating an optimal hedge.

6. The method of claim 1 further comprising calculating a minimum variance of the error between an optimal hedge and the calculated price of the financial derivative.

7. The method of claim 1 wherein the equation represents a risk-neutral discounted expected value of cash flows of the financial derivative.

8. The method of claim 7 wherein a cash flow of the financial derivative is path-dependent.

9. The method of claim 1 applied to derivatives of a set of non-marketed variables wherein the market representative $x_m$ comprises a combination of multiple marketed assets, each most-correlated with a different non-marketed variable in the set of non-marketed variables.

10. The method of claim 1 wherein the calculated price of the financial derivative includes cash flows at an intermediate time and a terminal time.

11. The method of claim 1 wherein drift rates, an interest rate, variances, and covariances of $x_e$ and $x_m$ either vary with time or are governed by stochastic processes.

12. The method of claim 1 wherein the cash flow depends on marketed variables as well as non-marketed variables.

13. The method of claim 1 wherein the equation involves additional non-marketed variables.

14. The method of claim 1 wherein the market representative is derived from a combination of multiple marketed variables, and wherein $x_e$ and the multiple marketed variables are governed by either geometric Brownian motion or alternative processes.

* * * * *